United States Patent [19]

Marc

[11] Patent Number: 4,851,167
[45] Date of Patent: Jul. 25, 1989

[54] MOLDING PROCESS AND APPARATUS

[75] Inventor: Michel Marc, Wellesley, Mass.

[73] Assignee: Clint, Inc., Natick, Mass.

[21] Appl. No.: 95,862

[22] Filed: Sep. 14, 1987

[51] Int. Cl.[4] ...................... B29C 67/22; B29C 35/12; B29C 39/42; C08J 9/06
[52] U.S. Cl. .................... 264/26; 264/40.5; 264/45.2; 264/54; 264/101; 264/314; 425/149; 425/388; 425/389; 425/817 R
[58] Field of Search ............... 264/26, 314, 313, 45.2, 264/54, 25, 101, 40.5; 425/149, 388, 389, 817 R

[56] References Cited

U.S. PATENT DOCUMENTS

| 1,146,413 | 7/1915 | Edison | 264/314 X |
| 2,363,107 | 11/1944 | Young | 264/314 X |
| 2,838,796 | 6/1958 | Reed | 264/314 X |
| 2,907,074 | 10/1959 | Rhodes | 264/314 X |
| 2,929,109 | 3/1960 | Cresap | 264/314 X |
| 2,937,401 | 5/1960 | Amos | 264/314 X |
| 2,979,246 | 4/1961 | Liebeskind | 264/54 X |
| 3,389,198 | 6/1968 | Taber | 264/54 X |
| 3,455,483 | 7/1969 | Inklaar | 264/54 X |
| 3,470,119 | 9/1969 | Benning et al. | 264/54 X |
| 3,530,208 | 9/1970 | Rausing | 264/45.2 |
| 3,535,740 | 10/1970 | Frowde | 264/314 X |
| 3,614,811 | 10/1971 | Johnson | 364/314 X |
| 3,664,799 | 5/1972 | Wallick, Jr. et al. | 264/314 X |
| 3,766,669 | 10/1973 | Pearsall | 264/26 X |
| 3,937,774 | 2/1976 | Wiley et al. | 264/26 |
| 4,110,139 | 8/1978 | Mashida et al. | 264/26 X |
| 4,268,238 | 5/1981 | Marc | 264/26 X |
| 4,296,053 | 10/1981 | Doerer et al. | 264/26 |
| 4,353,855 | 10/1982 | Garabedian | 264/314 X |
| 4,441,876 | 4/1984 | Marc | 264/26 X |
| 4,680,150 | 7/1987 | Matsuda | 264/26 |

FOREIGN PATENT DOCUMENTS

| 1153159 | 3/1958 | France | 264/26 |
| 57-151320 | 9/1982 | Japan | 264/45.2 |
| 2065022A | 6/1981 | United Kingdom | 264/314 |

Primary Examiner—Philip Anderson
Attorney, Agent, or Firm—Wolf, Greenfield & Sacks

[57] ABSTRACT

A flow molding process and associated molding apparatus for making plastic parts employing a radio-frequency heating field. In a two-piece mold, a diaphragm is supported thereacross and over a foam plastic compound that is disposed in the bottom half of the mold. A fluid is adapted to be introduced into the mold against the diaphragm. The introduction of this fluid is controlled to initially inject the fluid into the mold to cause deflection of the diaphragm to thus expel substantially all air from the mold and to thereafter extract the fluid from the mold during the heating cycle as the material expands, the extraction causing a vacuum that assists in the plastic foam compound expansion.

26 Claims, 1 Drawing Sheet

MOLDING PROCESS AND APPARATUS

BACKGROUND OF THE INVENTION

1. Field of the Invention

The present invention relates in general to a flow molding process and associated apparatus. More particularly, the invention pertains to the forming of thermoplastic parts using radio-frequency heating. Even more particularly the invention is described herein, in connection with a radio-frequency dielectric heating process for forming a finished foam plastic piece.

2. Background Discussion

Reference is now made to the present inventor's prior U.S. patents. This includes U.S. Pat. No. 4,268,238 granted May 19, 1981 and pertaining to a flow molding apparatus that is particularly adapted for the construction of three-dimensional pieces. This patent describes a flow molding process and associated molding apparatus for making plastic parts or pieces utilizing a radio-frequency heating field along with means for applying constant pressure, along with an even temperature gradient, to the plastic part. The other prior art of the present inventor is U.S. Pat. No. 4,441,876 granted April 10, 1984 and also relating to a flow molding process and associated molding apparatus for making plastic parts or pieces utilizing a radio-frequency heating technique. This particular patent relies upon the matching of dielectric constants. The apparatus in this patent is in particular employed for forming pieces having different thicknesses throughout. The purpose being to provide uniform heating throughout the piece being fabricated regardless of the varying thicknesses thereof.

It is an object of the present invention to provide an improved method and associated apparatus for molding plastic pieces of the type formed from a foamable plastic compound.

Another object of the present invention is to provide an improved method and associated apparatus for molding plastic pieces which are particularly adapted for the fabrication of pieces having non-uniform thickness throughout.

A further object of the present invention is to provide a flow molding process and associated apparatus wherein the molds are of simple construction and wherein the process can be carried out without great complexity.

A further object of the present invention is to provide a flow molding technique employing a radio-frequency field for heating and in which the technique is adapted to provide uniformity of heating of the material as well as providing for a reduction in the time required for carrying out the heating and formation step.

SUMMARY OF THE INVENTION

To accomplish the foregoing and other objects, features and advantages of the invention, there is provided a flow molding apparatus comprising a mold including electrode means along with means defining a cavity for receiving a material that is to be finally formed into a finished piece. The material that is disposed in the cavity is a foamable plastic compound such as a polyethylene powder with a blowing agent. The apparatus of the invention also comprises a deformable diaphragm disposed in the cavity and means for establishing an electromagnetic heating field across the mold during a predetermined heating cycle. A fluid means is provided and is adapted to be introduced into the mold against the diaphragm. Means are provided for controlling the displacement of the fluid to initially inject the fluid into the mold to cause deflection of the diaphragm toward the material, and thereafter to extract the fluid from the mold during the heating cycle as the material expands. The means for controlling the fluid may be comprised of a fluid displacement means that may be in the form of a piston assembly. This fluid displacement means includes a coupling port in the mold through which the fluid is injected into the mold or alternatively through which the fluid is extracted from the mold. The fluid displacement means causes the diaphragm to deflect and deform against the material to thus remove substantially all air from the mold cavity. The removal of the air means there will be a faster heating time than if the air were present. The removal of the air also provides for even heating in all sections of the mold cavity. The fluid displacement means is also controlled during the heating cycle to extract the fluid causing a vacuum in the mold to thus assist in the expansion of the foamable plastic compound. In this regard, the extraction rate of the fluid is preferably matched to the expansion rate of the material. At the end of the heating cycle, the diaphragm is essentially against the top wall of the cavity so that the finished piece has a size matching the mold cavity less the diaphragm thickness.

In accordance with a further aspect of the present invention, there is provided a flow molding process using radio-frequency dielectric heating of a foamable plastic material that is adapted to be expanded into a finished foam piece and that is disposed in a mold cavity. This process comprises the steps of, supporting a flexible and deformable diaphragm across the mold cavity, disposing the foamable plastic material in the mold cavity under the diaphragm, applying a pressure against the diaphragm on a surface threof opposite to the material side of the diaphragm to cause the diaphragm to deflect against the material thus removing air from the cavity, applying radio-frequency heating to the mold cavity over a heating cycle, and releasing the pressure against the diaphragm at a predetermined rate comparable to the rate of material expansion. In accordance with the process of this invention, the control of movement of the diaphragm includes providing a fluid to apply pressure against the diaphragm. the pressure is applied by injecting fluid into the mold cavity. The pressure is released by extracting the fluid from the cavity to provide a vacuum in the cavity to thus assist in material expansion. In this regard, the diaphragm, upon release, deflects against the top of the cavity so that the finished piece configuration is determined by the cavity configuration less the diaphragm thickness. In the disclosed embodiment, the diaphragm has an intermediate position at the beginning of the operation, is deflected toward the material at initiation of the heating cycle or just before initiation of the heating cycle, and furthermore has a final position against the top of the mold cavity at the end of the heating cycle. The final position of the diaphragm is one in which it is displaced away from the intermediate position in the opposite direction to the initial heating postion.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
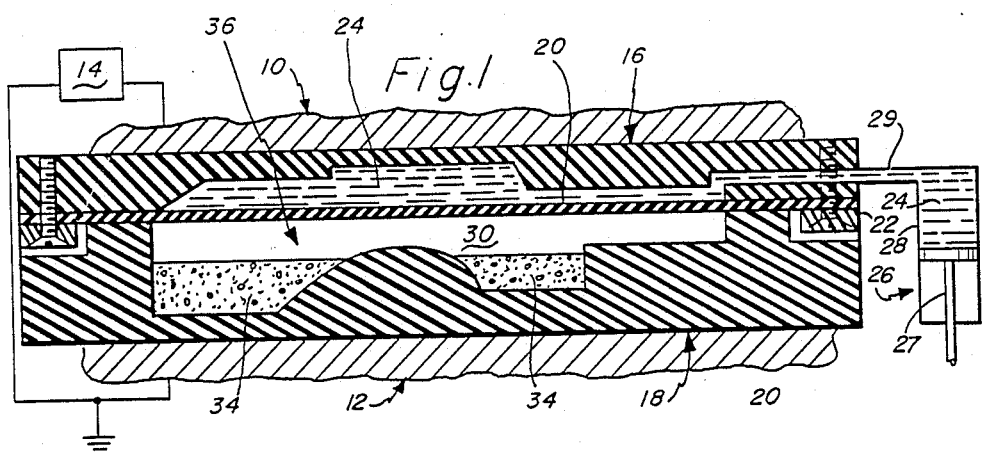
FIG. 1 is a cross-sectional view of the molding apparatus of the present invention at an initial step in the process.
Figure 2:
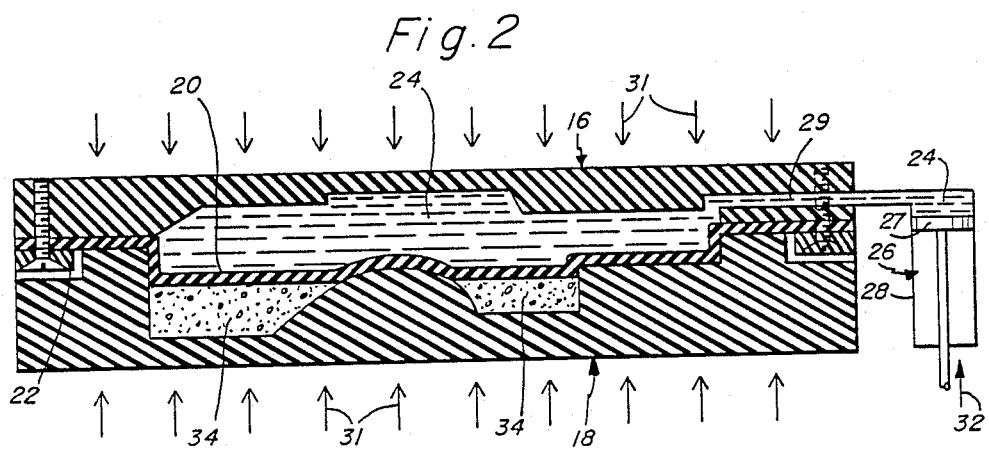
FIG. 2 is a cross-sectional view of the molding apparatus in a subsequent step of the process.
Figure 3:
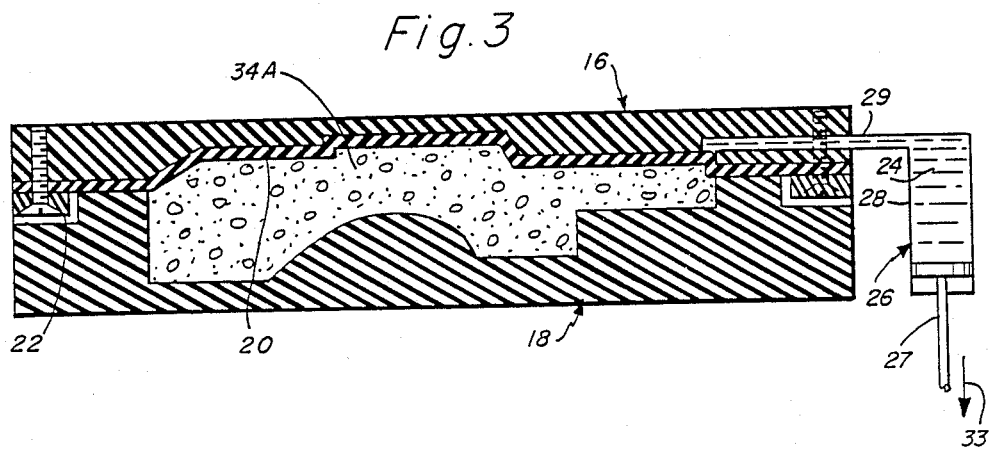
FIG. 3 is a final cross-sectional view of the molding apparatus in a final step of the process in which the finished piece has been completed.

Reference is now made to the drawings. FIGS. 1-3 illustrate in sequence the steps tht are carried out in accordance with the apparatus and process of the present invention. More particularly, there is described herein a process for the molding, of a foamable plastic compound, to form a finished foam plastic piece employing radio-frequency dielectric heating techniques. In connection with radio-frequency dielectric heating, refer to the previously mentioned U.S. Pat. Nos., 4,268,238 and 4,441,876.

The apparatus that is described herein generally includes top and bottom electrodes, a master mold, typically constructed of silicone rubber, and means for applying an RF heating field to the electrodes. In the following description of the sequence in FIGS. 1-3, like reference characters will be employed throughout the drawings to identify the same parts.

The molding apparatus of the present invention includes electrodes 10 and 12 having the mold disposed therebetween. FIG. 1 in particular illustrates the electromagnetic energy source 14 having separate lines coupling to the respective electrodes 10 and 12. The electromagnetic energy source 14 couples to these electrodes for establishing a potential difference therebetween. This establishes a heating field between the electrodes and across the mold.

The mold itself is comprised of a top mold half 16 and a bottom mold half 18. Disposed between the mold halves, and essentially clamped to the top mold half 16, is the deformable diaphragm 20. In the drawings, note the clamp at 22 for clamping the diaphragm to the top mold half 16. The diaphragm 20 is of uniform and equal thickness along its entire length, but is constructed to be relatively substantially deformable. For example, it is required to deform from the position of FIG. 1 to the position of FIG. 2 as will be described in further detail hereinafter. The deformable diaphragm 20, as well as the mold halves 16 and 18 may all be constructed of silicone rubber. The mold halves 16 and 18 may be constructed of a less flexible silicone rubber than the diaphragm 20. The diaphragm 20 is meant to be deflected and deformed while the mold halves are meant to maintain their inner configuration so as to properly form the piece being fabricated.

The displacement of the diaphragm 20 is carried out by a fluid displacement means that is basically comprised of the dielectric fluid 24 and the piston assembly 26. The dielectric fluid 24 may be a silicone oil. The piston assembly 26 comprises piston 27, cylinder 28 for accommodating the piston 27 and coupling port 29 which provides fluid communication from the cylinder into the mold cavity. In this regard, the mold cavity is considered to be the area between the mold halves identified in FIG. 1 as cavity 30.

In accordance with the process of the present invention, the electromagnetic heating source 14 and the piston assembly 26 are operated in a controlled manner. The source 14 is activated during a heating cycle. Heating energy is thus applied to the mold. During this heating cycle, the mold halves are clamped together by means not described specifically herein. In FIG. 2, the arrows 31 illustrate this clamping function.

The piston assembly 26 is likewise operated in a controlled manner, particularly during the heating cycle so as to assist in the formation of the finished part, all to be described in further detail hereinafter.

Reference is now made to the general process of the present invention and in particular to FIG. 1. FIG. 1 illustrates an initial step in the process in which the mold halves 16 and 18 are joined, but not necessarily tightly clamped together. The diaphragm 20 is shown in what might be termed an intermediate position extending substantially horizontally and clamped, as illustrated, to the top mold half 16. The pressure applied by the piston assembly 26 is of partial pressure and of a magnitude so that the diaphragm is maintained in the position illustrated in FIG. 1. It is noted that the piston 27 is about at a mid-point of its travel in the cylinder 28.

FIG. 1 also illustrates the foamable plastic compound at 34. The foamable plastic compound 34 may be comprised of polyethylene powder with a blowing agent so as to provide relatively substantial expansion upon heating. As noted in FIG. 1, the compound 34 fills only a bottom segment of the mold cavity in the bottom mold half 18. In the particular position of FIG. 1, there is, above the material 34, an air space at 36. This air space is disposed essentially between the bottom surface of the diaphragm 20 and the plastic foam compound 34.

After the foamable compound 34 has been loaded as illustrated in FIG. 1, the mold is closed as is also illustrated in FIG. 1. However, at this time, the mold is not necessarily clamped. The space between the top of the diaphragm 20 and the top mold half 16 is then filled further with the dielectric liquid 24. In this regard, refer to the next sequence in FIG. 2. This operation is used to expel air from the previously referred to air space 36. This expels the air from the mold cavity. The air may be expelled through a vent hole or, alternatively, the air may simply be expelled between the diaphragm and the bottom mold half 18 prior to clamping between the mold halves. In either instance, once the diaphragm 20 has been deformed to the configuration illustrated in FIG. 2, then the mold halves are clamped together as indicated by the arrows 31 in FIG. 2.

It is noted in FIG. 2 that the piston assembly 26 has been moved to a position in which the piston 27 is at a top end of the cylinder 28. This has caused the dielectric liquid 24 to be injected into the mold cavity above the diaphragm 20. This in turn has caused the diaphragm 20 to deflect and deform so as to in substance rest against portions of the bottom mold half 18 as well as the foamable plastic compound 34. Again, the position of the diaphragm 20 is clearly illustrated in the intermediate step shown in FIG. 2. This is in essence, a maximum pressure position for the diaphragm 20.

It is noted that the particular part that is being fabricated herein, has varying thickness. To obtain even heating throughout the mold, it is preferred to employ the concepts described in my earlier U.S. Pat. No. 4,441,876 granted Apr. 10, 1984. This patent teaches the matching of dielectric constants of the various materials employed. The preferred technique is to alter the dielectric constant of the mold, diaphragm and fluid so that it matches the dielectric constant of the foamable plastic compound. The dielectric constant is modified by mixing different compounds or substances to obtain the same dielectric constant as that of the foamable plastic compound. For example, one can start with silicone rubber which may have a dielectric constant in the range of 3.4 to 4.1, (the foamable plastic compound may have a dielectric constant in the range of 2.0–8.0) and arrive at a proper dielectric constant by mixing with the silicone rubber, in a proper percentage, some other material having either a higher or lower dielectric constant so as to provide the desired dielectric constant matching. If the silicone rubber has a lower dielectric constant than the plastic foam compound, then a proper proportion of a high dielectric material is added to the silicone rubber or to the silicone oil to provide dielectric constant matching. A material that may be used to provide the dielectric constant matching, and one which has a high dielectric constant, may be one of calcium titanate, barium titanite, or titanium dioxide.

If the silicone rubber has a higher dielectric constant than the foamable plastic compound, then a lower dielectric constant material is added to the silicone rubber. By way of example, microspheres may be added to the silicone rubber composition so as to lower the dielectric constant of the silicone rubber so that it matches that of the foamable plastic compound. In connection with the microspheres, they have a dielectric constant of round unity and thus by adding them in the proper proportion to the silicone rubber, the dielectric constant is reduced so that the proper matching occurs.

In accordance with the application herein, this modification of dielectric constant is preferably applied to the mold halves 16 and 18 as well as to the diaphragm 20 and the dielectric fluid 24. All of these components of the apparatus are modified so as to have a dielectric constant that is equal to that of the foamable plastic compound 34. For a further description of the technique for modifying the silicone rubber refer to further details in my U.S. Pat. No. 4,441,876, particularly as to the amounts of additive material that are to be employed.

The selection of the additive for the silicone rubber and silicone oil is determined by first ascertaining the dielectric constant of the particular foamable plastic compound that is to be used. Once it is determined whether the dielectric constant thereof is higher or lower than the normal dielectric constant of the silicone rubber material used, then the proper additive can be introduced. Again, if the dielectric constant of the silicone rubber or silicone oil is to be reduced, the microspheres are added, and on the other hand, if the dielectric constant is to be increased, then a substance such as barium titanate is added to the material. In connection with these additives, it is noted that they are preferably added to not only the mold but also the diaphragm and the fluid.

As described previously, upon injecting additional fluid into the mold cavity, essentially all of the air in the cavity is removed. This will provide for a faster heating time in comparison to prior techniques in which air remains in the cavity. Furthermore, the expelling of the air provides the aforementioned even heating in all sections. If the air remains in the cavity, then there could not be a complete matching of dielectric constants. However, by expelling the air, then more even heating can be carried out and thus more uniformity of formation of the finished part.

Once the apparatus is in the position of FIG. 2, with the mold halves clamped, then the heating field is applied. This heating field may be applied for a predetermined length of time which is basically a function of, inter alia, the intensity of the field, the size of the part to be fabricated, and the particular material thereof. Over this heating period the piston assembly 26 gradually transitions in the direction of arrow 33 so as to gradually extract liquid from the cavity at a controlled rate that is essentially comparable to or matched with the rate of expansion of the foamable plastic compound. During this liquid extraction phase of operation, a vacuum is created in the mold by extracting the fluid back into the cylinder 28. This vacuum action assists in helping the foam to rise into its final configuration. This is illustrated in FIG. 3 at 34A.

One of the features noted in accordance with the present invention, is that the mold cavity need not be vented. Once, the mold apparatus is in the position of FIG. 2, as the foamable plastic compound 34 expands, in previous systems, some type of mold venting was required. However, in accordance with the present invention, the liquid displacement technique in combination with the diaphragm as described herein, eliminates the need for venting of the mold.

With particular reference to FIG. 3, it is noted that the finished foam part 34A essentially matches the contour of the mold. However, the final configuration is actually that of the mold cavity less the thickness of the diaphragm. Thus, in fabricating the mold for a particular part, the thickness of the diaphragm is to be taken into account.

In summary, in accordance with the present invention, there is provided a mold that is adapted to be used for the heating, by electromagnetic heating energy, of a foamable plastic compound to form a finished foam part. The mold supports a diaphragm and the diaphragm is, in turn, deflected and deformed by a fluid displacement means that provides for an initial injection of the fluid into the mold to cause deflection of the diaphragm against the foamable plastic compound, and thereafter, to extract the fluid from the mold during the heating cycle as the material expands. The extraction of the fluid provides a vacuum in the mold that assists in expansion of the foamable plastic compound.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A flow molding process using radio-frequency dielectric heating of a foamable plastic material that is adapted to be expanded into a finished foam piece and that is disposed in a mold cavity, said process comprising the steps of, supporting a flexible and deformable diaphragm across the mold cavity, disposing a foamable plastic material in the mold cavity under the diaphragm, applying a pressure by controllably forcing a liquid into the mold cavity against the diaphragm on a surface thereof opposite to the material side of the diaphragm to cause the diaphragm to deflect against the material while permitting air to be removed from the cavity, applying radio-frequency heating to the mold cavity over a heating cycle, and concurrent with said heating releasing the pressure imposed by said liquid against the diaphragm, the applied pressure being released at a predetermined rate comparable to the rate of material expansion, said diaphragm, upon release, deflecting against a surface of the cavity.

2. A flow molding process as described in claim 1, wherein the pressure is released by extracting the fluid from the cavity to provide a vacuum in the cavity to assist in material expansion.

3. A flow molding process as described in claim 2 wherein the finished foam piece configuration is determined by the cavity configuration less the diaphragm thickness.

4. A flow molding process as described in claim 3 wherein the diaphragm has an intermediate position at the beginning, is deflected toward the material at initiation of the heating cycle, and has a final position against the top of the mold cavity at the end of the heating cycle.

5. A flow molding process as described in claim 4 wherein in the final position of the diaphragm it is displaced away from the intermediate position in the opposite direction to the initial heating position.

6. A flow molding process as described in claim 1 including partially closing the mold cavity during the application of pressure so as to enable air to be expelled from the mold cavity, and subsequently clamping the mold cavity closed to enable initiation of the heating cycle.

7. A flow molding process as described in claim 6 wherein the pressure is released by extracting the fluid from the cavity to provide a vacuum in the cavity to assist in material expansion.

8. Flow molding apparatus comprising:
a mold including electrode means and means defining a cavity for receiving a foamable plastic material that is to be finally formed into a finished foam piece,
a deformable diaphragm disposed in the cavity,
means for establishing an electromagnetic heating field across the mold, during a heating cycle, and
a fluid means adapted to be introduced into said mold against said diaphragm,
means for controlling the fluid means displacement to initially inject the fluid means into the mold to cause deflection of the diaphragm toward said material, prior to said heating cycle, and thereafter to extract the fluid means from the mold during said heating cycle as the material expands,
said fluid means control adapted to position said diaphragm first in an intermediate position with the mold unclamped and with an air pocket between said material and diaphragm, next in a deflected position against the material to thus remove substantially all air from the mold cavity, and lastly in an opposite deflected position against a surface of the mold.

9. Flow molding apparatus as described in claim 1 wherein said means for controlling the fluid includes means for moving the diaphragm in a controlled manner during the heating cycle and at a rate that matches the expansion rate of the material.

10. Flow molding apparatus as described in claim 1 wherein said electrode means comprises a pair of oppositely disposed electrodes, one on either side of the mold cavity.

11. Flow molding apparatus as described in claim 10 wherein said mold comprises a pair of separable mold pieces defining said mold cavity when closed.

12. Flow molding apparatus as described in claim 11 wherein said mold cavity is non-planar for providing a non-planar finished piece.

13. Flow molding apparatus as described in claim 12 wherein said means for establishing comprises an electromagnetic energy source connected to said electrodes.

14. Flow molding apparatus as described in claim 13 wherein said mold pieces are comprised of silicone rubber.

15. Flow molding apparatus as described in claim 14 wherein said diaphragm comprises flexible silicone rubber.

16. Flow molding apparatus as described in claim 15 wherein said fluid means comprises silicone oil.

17. Flow molding apparatus as described in claim 1 wherein said means for controlling the fluid means displacement includes means for controlling the diaphragm movement during the heating cycle to provide a vacuum in the mold to assist in material expansion.

18. Flow molding apparatus as described in claim 9 wherein the dielectric constant of the mold, material, diaphragm and fluid means are collectively matched to provide uniform heating in the mold.

19. Flow molding apparatus comprising;
a mold including electrode means and means defining a cavity for receiving a foamable plastic material that is to be finally formed into a finished foam piece,
a deformable diaphragm disposed in the cavity,
means for establishing an electromagnetic heating field across the mold, during a heating cycle, and
a fluid means adapted to be introduced into said mold against said diaphragm,
means for controlling the fluid means displacement to initially inject the fluid means into the mold to cause deflection of the diaphragm toward said material prior to said heating cycle, and thereafter to extract the fluid means from the mold during said heating cycle as the material expands
said means for controlling the fluid means including fluid displacement means including a coupling port in the mold through which the fluid is injected into the mold and through which the fluid is extracted from the mold,
said fluid displacement means causing the diaphragm to deflect and deform against the material to thus remove substantially all air from the mold cavity,
the fluid displacement means is controlled during the heating cycle to extract the fluid causing a vacuum in the mold to assist in material expansion,
the extraction rate of fluid is matched to the expansion rate of the material.

20. Flow molding apparatus as described in claim 19 wherein said fluid displacement means includes a piston means.

21. Flow molding apparatus as described in claim 19 wherein the finished foam piece has a size of the mold cavity less the diaphragm thickness.

22. Flow molding apparatus comprising a mold including electrode means and means defining a cavity for receiving a foamable plastic material that is to be finally formed into a finished foam piece,
a deformable diaphragm disposed in the cavity,
means for establishing an electromagnetic heating field across the mold, during a heating cycle, and
a fluid means adapted to be introduced into said mold against said diaphragm, means for controlling the fluid means displacement to initially inject the fluid means into the mold to cause deflection of the diaphragm toward said material, and thereafter to extract the fluid means from the mold during said heating cycle as the material expands, said means for controlling the fluid means including fluid displacement means for injecting fluid into the mold over the diaphragm to cause the diaphragm to deflect and deform against the material to thus remove air from the cavity, and, during the heating cycle, to extract the fluid causing a vacuum in the mold to assist in material expansion.

23. A flow molding apparatus as described in claim 18 wherein the dielectric constant matching includes an additive for increasing the dielectric constant.

24. A flow molding apparatus as described in claim 23 wherein the additive is one of calcium titanate, barium titanate, and titanium dioxide.

25. A flow molding apparatus as described in claim 18 wherein the dielectric constant matching includes an additive for decreasing the dielectric constant.

26. A flow molding apparatus as described in claim 25 whereas the additive comprises microspheres.

* * * * *